United States Patent
Palomares Mora

(10) Patent No.: US 10,723,606 B2
(45) Date of Patent: Jul. 28, 2020

(54) ELEVATOR SYSTEM FOR AUXILIARY POWER UNIT

(71) Applicant: AIRBUS OPERATIONS SL, Madrid (ES)

(72) Inventor: Angel Palomares Mora, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 119 days.

(21) Appl. No.: 15/816,203

(22) Filed: Nov. 17, 2017

(65) Prior Publication Data
US 2018/0162706 A1 Jun. 14, 2018

(30) Foreign Application Priority Data
Nov. 17, 2016 (EP) ..................................... 16199282

(51) Int. Cl.
| B66F 11/04 | (2006.01) |
| B64F 5/50  | (2017.01) |
| B60P 1/02  | (2006.01) |
| B66F 7/14  | (2006.01) |
| B64D 41/00 | (2006.01) |
| B64F 5/10  | (2017.01) |

(52) U.S. Cl.
CPC ................ B66F 11/04 (2013.01); B60P 1/02 (2013.01); B64D 41/00 (2013.01); B64F 5/10 (2017.01); B64F 5/50 (2017.01); B66F 7/14 (2013.01); *B64D 2041/002* (2013.01)

(58) Field of Classification Search
CPC .... B66F 11/04; B66F 7/14; B64F 5/50; B60P 1/02; B64D 2041/002; B64D 2041/00; B64G 5/10; B64G 5/50
See application file for complete search history.

(56) References Cited

U.S. PATENT DOCUMENTS

| 1,993,245 | A | * | 3/1935 | Meron | ...................... | B60P 1/02 |
| | | | | | | 187/244 |
| 2,702,678 | A | * | 2/1955 | Flock, Jr. | .................. | B64F 1/32 |
| | | | | | | 244/137.1 |
| 2,772,004 | A | | 11/1956 | Noble | | |
| 2,867,334 | A | * | 1/1959 | Aiken | ...................... | B64F 5/50 |
| | | | | | | 414/589 |
| 3,028,130 | A | * | 4/1962 | Burton | ..................... | B64D 9/00 |
| | | | | | | 244/137.1 |
| 3,120,316 | A | * | 2/1964 | Luchford | ................ | B66C 19/02 |
| | | | | | | 414/460 |

(Continued)

FOREIGN PATENT DOCUMENTS

| CN | 204279977 | 4/2015 |
| DE | 20 2004 015422 | 12/2004 |
| GB | 1086290 | 10/1967 |

OTHER PUBLICATIONS

European Search Report for EP16199282.1, dated Mar. 30, 2017, 5 pages.

*Primary Examiner* — Katherine W Mitchell
*Assistant Examiner* — Candace L Bradford
(74) *Attorney, Agent, or Firm* — Nixon & Vanderhye P.C.

(57) ABSTRACT

An elevator system (400) to assist the installation of a heavy load (122), such as an auxiliary power unit (APU) in into a compartment of an aircraft (110) compartment (126). The elevator system includes bar assemblies which rotate to lift the load into the compartment. The bar assemblies rotate in synchrony.

5 Claims, 5 Drawing Sheets

(56) References Cited

U.S. PATENT DOCUMENTS

| | | | | |
|---|---|---|---|---|
| 3,187,907 | A * | 6/1965 | Yost | B60P 1/02 |
| | | | | 414/663 |
| 3,552,587 | A * | 1/1971 | Warren | B64C 1/22 |
| | | | | 244/137.1 |
| 3,858,688 | A * | 1/1975 | Galloway | B66F 11/04 |
| | | | | 187/224 |
| 3,964,575 | A * | 6/1976 | Gostling | E04G 5/02 |
| | | | | 182/230 |
| 3,972,427 | A * | 8/1976 | Stanley | B60P 1/02 |
| | | | | 244/137.1 |
| 4,586,684 | A * | 5/1986 | Carter | B64C 1/22 |
| | | | | 182/148 |
| 4,739,592 | A * | 4/1988 | Baguena Molina | E04G 5/12 |
| | | | | 52/63 |
| 4,907,675 | A * | 3/1990 | Saby | E04G 1/14 |
| | | | | 182/104 |
| 5,549,408 | A * | 8/1996 | Lo | A47B 47/0016 |
| | | | | 403/171 |
| 6,027,290 | A * | 2/2000 | Andre | B60P 1/02 |
| | | | | 187/215 |
| 6,039,287 | A | 3/2000 | Liston et al. | |
| 6,123,495 | A * | 9/2000 | Callahan | B64F 5/50 |
| | | | | 254/323 |
| 8,807,532 | B2 * | 8/2014 | Horwath | B66F 7/14 |
| | | | | 254/92 |
| 2002/0014568 | A1* | 2/2002 | Faucher | A61G 7/1042 |
| | | | | 248/354.3 |
| 2004/0211153 | A1* | 10/2004 | Dubbert | E04G 5/04 |
| | | | | 52/782.1 |
| 2005/0056484 | A1* | 3/2005 | Fredette | B66F 11/04 |
| | | | | 182/62.5 |
| 2005/0173601 | A1* | 8/2005 | Hestand | B60P 1/02 |
| | | | | 248/129 |
| 2009/0278021 | A1* | 11/2009 | Jimeno De La Torre | |
| | | | | B64F 5/50 |
| | | | | 248/554 |
| 2015/0367962 | A1* | 12/2015 | Vigneau | B64F 5/50 |
| | | | | 254/89 H |
| 2018/0162706 | A1* | 6/2018 | Palomares Mora | B64D 41/00 |
| 2018/0282130 | A1* | 10/2018 | Kale | B66C 13/30 |

* cited by examiner

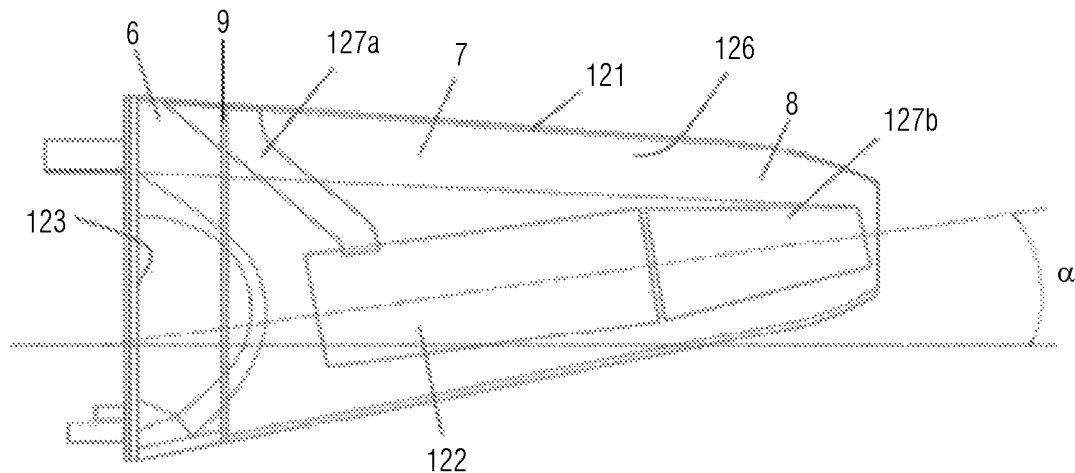
Fig.5
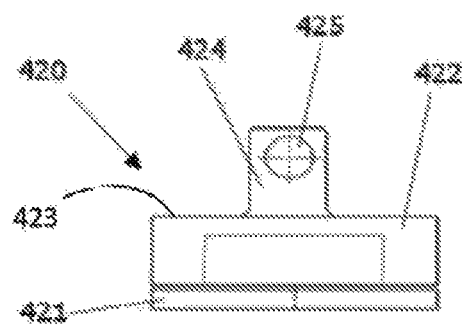
Fig.6a1
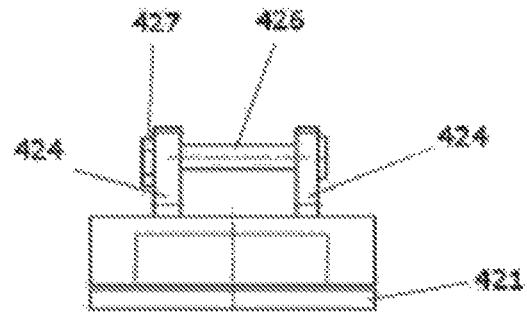
Fig.6a2
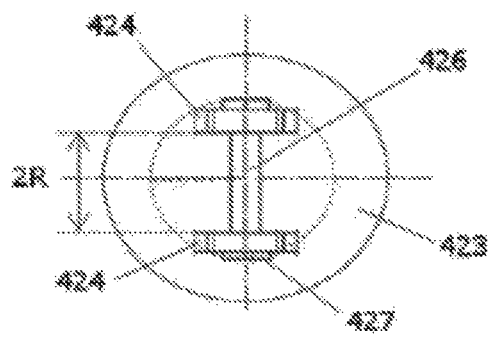
Fig.6a3
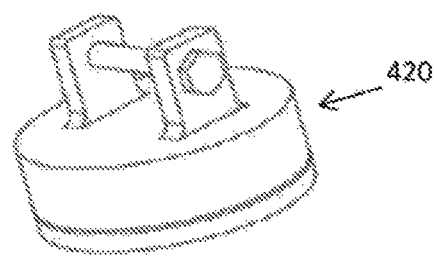
Fig.6a4

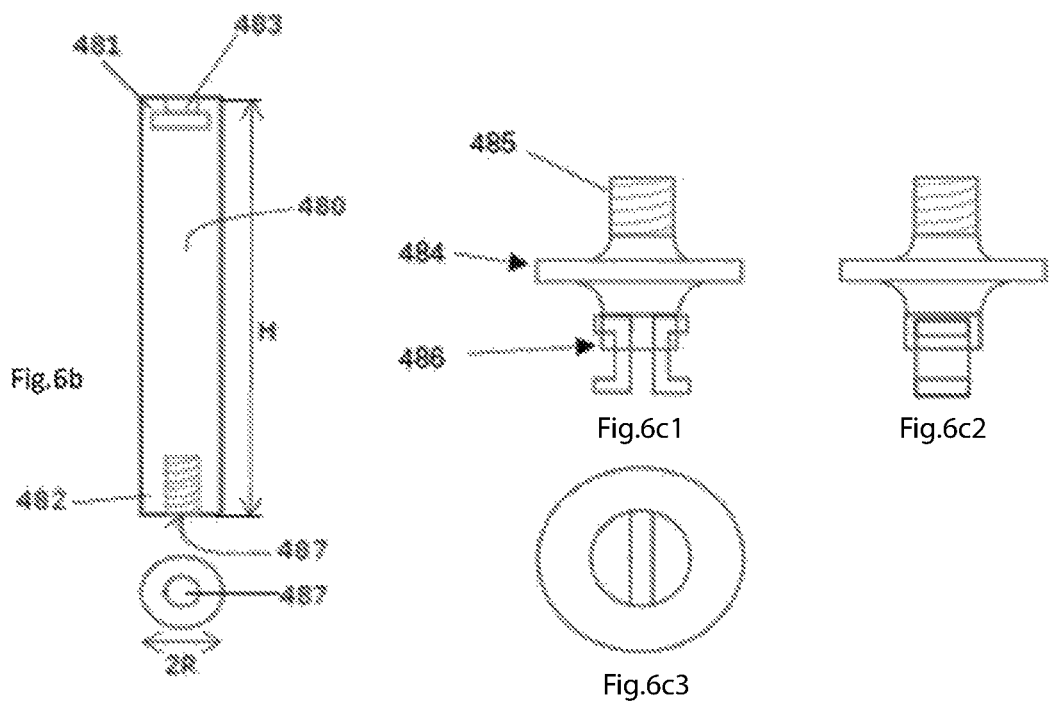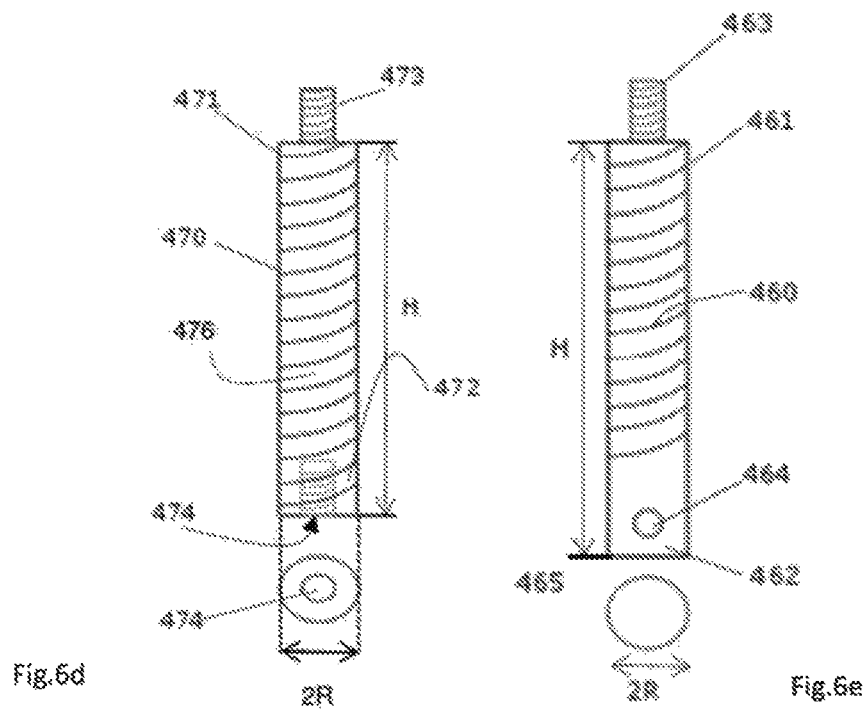

ELEVATOR SYSTEM FOR AUXILIARY POWER UNIT

RELATED APPLICATION

This application claims priority to European Patent Application EP16199282.1 filed Nov. 17, 2016, the entirety of which is incorporated by reference.

FIELD OF THE INVENTION

The present invention is in the aeronautical field, and relates to an elevator system to lift and position a structure within an aircraft and to integrate the structure with the aircraft. More specifically, the invention is intended to assist the installation of auxiliary power unit ("APU") and its ancillary elements inside the housing of a tail cone of the fuselage of an aircraft.

BACKGROUND OF THE INVENTION

As is known in the aeronautical industry, the rear of a fuselage 120 in an aircraft 110 is generally known as tail cone 121, which is shown in FIG. 1. The tail cone typically houses at least one Auxiliary Power Unit (APU) 122. The APU 122 is typically a gas turbine as is used to power the aircraft 110 with electric, pneumatic and/or hydraulic power, especially with the aircraft's main engines are not operating.

The APU 122 typically serves one or more of the following main functions:

(i) provide power to aircraft systems while the main aircraft engines 131, 132, are not running;

(ii) provide power to start the main engines 131,132, without need for a power source external to the aircraft;

(iii) provide power to the aircraft 110 while the aircraft 110 is waiting at an airport gate or is otherwise stationary and especially when the main engines are not running;

(iv) generate electrical power for aircraft systems; and (v) provide hot air for the pneumatic systems, such as hot air for an air conditioning system and/or an anti-ice system in the aircraft.

A current trend of most aircraft manufacturers is to locate the APU 122 in the tail cone 121, to protect the cabin of the aircraft fuselage 130 in the event of a failure of the APU. The APU compartment is separated from the cabin a via a bulkhead firewall 123.

Inside the tail cone 121, the conventional construction used to maintain and stabilize the APU 122 is a support system 124. The support system 124 of APU 122 comprises a frame of rods or bars secured directly to a semi-single-hull structure of the tail cone 121. The support system 124 is shown in detail in FIG. 2.

To have access to the tail cone 121 and particularly to the APU and its ancillary systems 127a, 127b, it is common to have a door 125 on the underside of the tail cone 121.

The amount of unused space inside the APU compartment 126 is small. The space is becoming smaller because APUs 1222 and their ancillary systems 127a, 127b are becoming larger to meet increased demands for electrical power in modern aircraft 110 and to reduce the noise from the APU to meet increasingly stringent noise abatement regulations.

To install an APU 122 in the compartment 126, it is conventional to use a fish pole wire lift system 140, as shown in FIG. 3. The fish pole wire lift system lifts an APU from the ground and up into the APU compartment using wires suspended from hooks within the APU compartment. The tolerances are tight between the APU and the walls and other structures in the APU compartment, and are particularly tight with respect to the installation of the APU to the support system 124.

Due in part to the tight tolerances, APUs installed using fish pole wire lift systems 140 may become misaligned with respect to the support system 124 during installation, may become damaged during installation or damage the compartment or the ancillary components of the APU. Further, the installation process tends to be long when using a fish pole wire lift system. The installation process with a fish pole wire lift system 140 usually needs at least two operators each using respectively one of the control systems 141, 142 to install the APU 122 in the APU compartment 126. Also, fish pole wire lift systems 140 pose a danger in that the APU 122 may fall to the ground and injury an operator(s) if the wires break or come loose or the APU disengages from the wires.

SUMMARY OF THE INVENTION

To address the drawbacks stated above for fish pole wire lift systems, an invention has been conceived and is disclosed here that is an elevator system which allows to the APU to be raised from the ground or a platform and into the APU compartment in the tail cone of the aircraft. The invention may be embodied to lift a heavy load, such as an APU through the narrow door opening at the bottom of a tail cone, into a compartment for the load in the tail cone and position the load to be secured to a support system within the compartment.

The invention may comprise:

(i) a support, such as a cart, mounted on a set of wheels, able to move via a manual traction or a set of electric motors, the electric motors being able to be managed by a terminal; the support having an upper surface on which are attachment points to fasten at least two base elements, each base elements being able to pivot a bar, the bar comprising: an upper bar having two ends, where a first end has a hole configured to receive an attachment means to fixate the elevator system to the internal structure of the aircraft compartment, and where a second end comprises a hole able to receive a fitting bolt, (ii) at least one standard bar, comprising two ends, where a first end comprises a fitting bolt respectively configured to screw inside the fitting hole of the upper bar, or the fitting hole of a standard bar, and where the second end comprises a fitting hole able to receive a fitting bolt; (iii) a lower bar comprising two ends, where a first end comprises a fitting bolt able to screw respectively inside the fitting hole, and where a second ends comprise a through bore able to receive a through bolt allowing to link a bar to a base element, wherein the lower and standard bar comprising respectively on their external surface a male thread, configure to allow the translation of a mount bracket fastened to the lateral part of the load, in order to up until the higher standard bar, or down until the lower bar the load according the sense of rotation of the bar.

The terminal may be able to be fixed and/or mobile from the support.

The attachment means may include a fixation means which fixates the elevator system via the upper bar to the internal structure of the aircraft compartment, and an expandable means fitted to adjust the length of the bar and fits the distance between the upper bar and the upper surface of the support.

The expandable means may be able to fit to the hole of the end of the upper bar, such as to allow to the bar to turn freely and avoid to the aircraft structure to support the weight of the load. Further, the expandable means may be configured to support a weight of the load of at least 1000 kg.

A wireless synchronization system may interact with the motors of the elevator system via a terminal to perform the following steps:

(i) determine from of a list of wireless motors, which categories for the motors, wherein the three categories are such as "motor for direction" of the wheel, "motor for orientation" of the wheel, and "motor to up and down" the load, (ii) connecting of the terminal to the wireless motor active, and (iii) a synchronization of step of each motor of each categories of motor move step by step in the same direction, and/or orientation and/or velocity.

In another embodiment, an inventive process has been conceived and is disclosed herein to manage the wireless communication from the terminals to control the different motors of the wheel to interact with the elevator system to control the direction, orientation, velocity, and braking of APU when being lifted into the compartment of the tail cone, wherein the terminal apply the following steps:

(i) Detection of a set of instruction from the operator composed with a direction, such as move forward, or move backward, and an orientation, such as turn right, or turn left, or move threat;

(ii) Deactivation of the brake system in response to an instruction from the terminal that is initiated by an operator, wherein the brake is activated by default when the operator doesn't interact with the terminal;

(iii) Regulation of the velocity of the movement of the APU towards the support according the pressure on the tactile interface of the terminal; and (iv) Activation of the brake system after complete realization of the instruction.

A process has been invented and is disclosed herein to control and regulate the velocity to up or down the load, wherein the terminal apply the following steps:

(i) Detection of an instruction from the operator such as "UP" or "Down";

(ii) Deactivation of the brake system in response to an instruction and setting the brake by default when the operator doesn't interact with the terminal;

(iii) Regulation of the velocity and the sense of rotation of each bar to move up or down the load via the translation of each mount bracket, the velocity being relative to the pressure on the tactile interface of the terminal; and (iv) Activation of the brake system after complete realization of the instruction.

In a fifth embodiment, the invention is a process to proceed to different sequences of shut down of the elevator system, wherein the terminal apply the following steps:

(i) If detection of contradictory instructions, when activation of the brake system and the last instruction received is remove;

(ii) for the motors of the wheels, if there is a detection of steps of de-synchronization of at least one motor with respect to the others motors of its category, then activation of the brake system and setup of the counter of step;

(iii) for the motors to move the load up or down, if there is a detection of a de-synchronization instruction of at least one motor with respect to the others motors of its category, then activation of the brake system, except for the motors in advance until all mount brackets arrive at the same level that the others; for that the operator has the possibility to turn the motors not brake in order to down the load via the interface;

(iii) if detection of a wireless de-synchronization of at least one motor with the terminal, then activation of the brake system and the synchronization phase restart; and (iv) for any emergency or request from the operator to stop the elevator system (400), the operator via the interface to activate the brake system.

BRIEF DESCRIPTION OF THE DRAWINGS

To complete the description and in order to provide for a better understanding of the invention, a set of drawings is provided. Said drawings form an integral part of the description and illustrate preferred embodiments of the invention. The drawings comprise the following figures:

FIG. 5 is a schematic representation of the APU mounted to a support and housed in the compartment;

FIGS. 6*a*1 to 6*a*4 shown different view of a base element of the elevator system;

FIG. 6*b* shows an upper bar of a bar assembly of the elevator system;

FIGS. 6*c*1 to 6*c*3 show views of an attachment device of the elevator system;

FIGS. 6*d* and 6*e* are views of lower and middle bars of a bar assembly of the elevator system;

FIGS. 6*f*1 to 6*f*4 are views of a mount bracket of the elevator system.

DETAILED DESCRIPTION OF EMBODIMENTS OF THE INVENTION

The present invention is an elevator system, in one embodiment, for lifting an auxiliary power unit ("APU") and associated systems into a tail cone of an aircraft. A person skilled in the relevant art will understand, however, that the invention may have additional embodiments, and that the invention may be practiced without several of the details of the embodiments described below with reference to FIGS. 4 to 6*f*.

Figure 4:
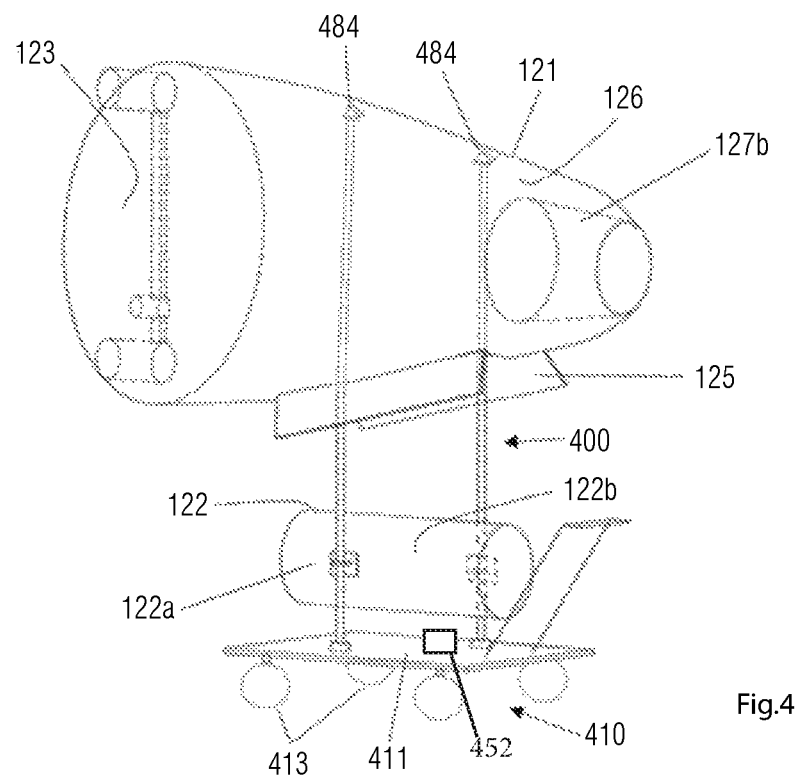
FIG. 4 is a schematic representation of an novel elevator system to raise the APU into the compartment.

As shown in FIG. 4, the installation of an APU 122 in its housing in an APU compartment 126 is assisted by an elevator system 400. The elevator system 400 comprises a support 410 on which the APU 122 is placed on an upper surface 411 of the support, which may be a dolly or a cart. The upper surface of the support 410 is mounted on a set of wheels 413 or equivalent means to allow the APU 122 to be moved into position below the tail cone. The set of wheels 413 is able to move the support via a manual pushing of the support 410 or via a set of electric motors.

The motors 452 are controlled by an operator using a terminal. The terminal may be fixed to the support and/or mobile with respect to the support 410. The terminal may communicate by wire or wirelessly with the controllers for the motors. The working of the terminal, its different modes of use and interaction with the elevator system 400 will be explain more in details during the rest of the description.

The upper surface 411 of the support 410 comprise attachments point used to fasten to at least two base elements 420 rigidly on the support 410. Each base element 420, as shown in detail in FIGS. 6a1 to 6a4, comprises an electric motor 452 comprising a stator 421 fixed to the support 410 and a rotor fixed on a circular plate 422. Each circular plate 422 comprises firmly on its upper surface 423 two parallel connecting rods 424. The connecting rods 424 each include a hole 425 able to receive a through bolt 426. The through bolt 426 receives at one end a nut 427 to secure the bolt to the hole 425.

Figure 6G:
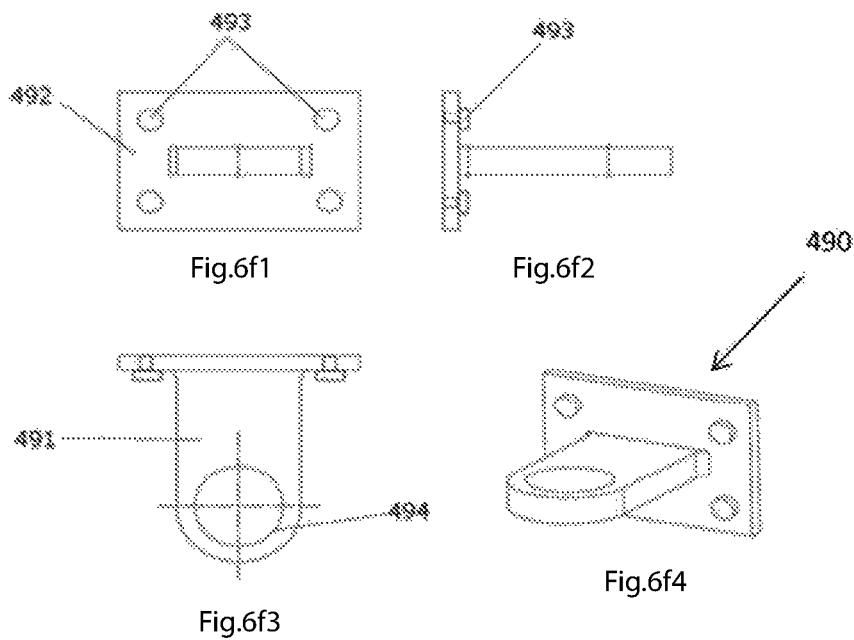
FIG. 6*g* is a perspective view of a mount bracket, bar assembly and base element of the elevator system.
Figure 6G:
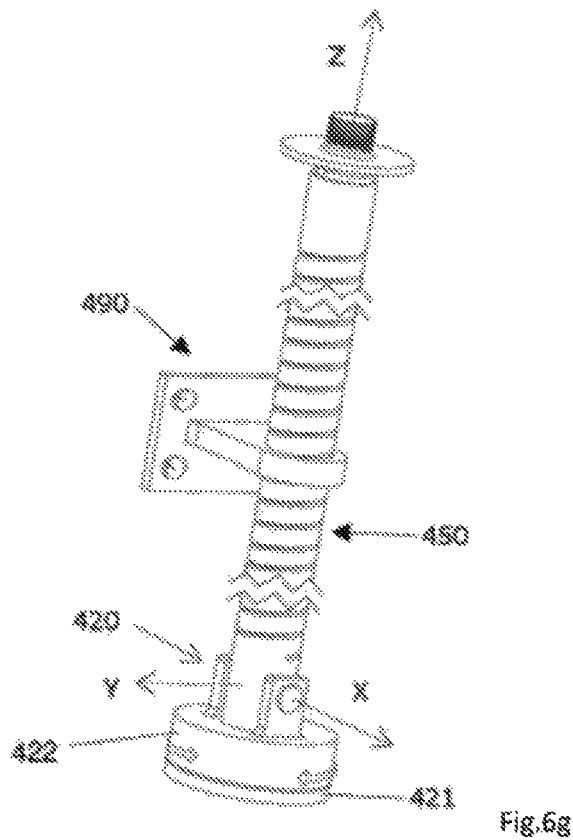

The elevator system 400 includes a bar assembly 450 (FIG. 6g) having a lower bar 460 (FIG. 6e), a middle (standard) bar 470 (FIG. 6d) and an upper bar 480 (FIG. 6b). The lower, middle and upper bars are connected at their ends to form the bar assembly have a total length the combined lengths of the lower, middle and upper bars.

To explain the assembly phase of the bar assembly 450 and its working to move an APU up or down, we will first describe the upper, middle and lower bars.

Figure 1:
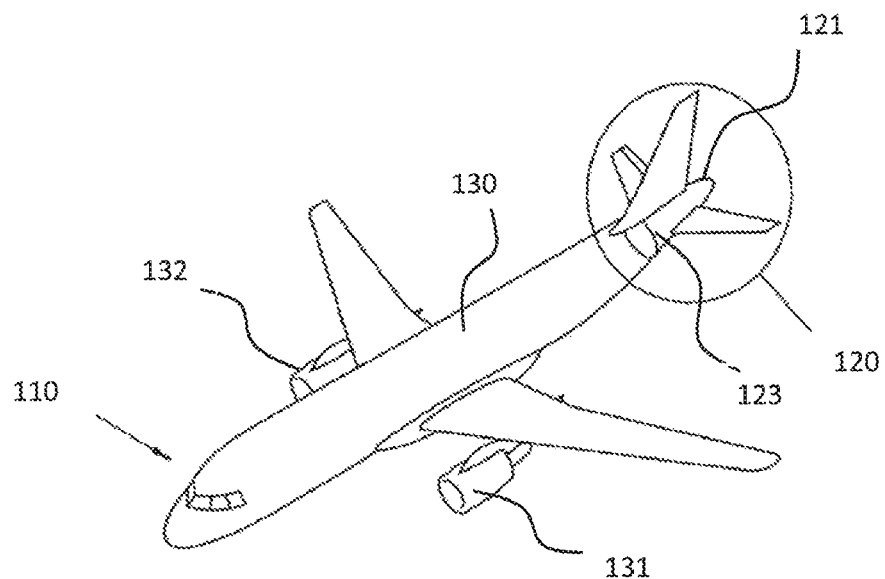
FIG. 1 is a schematic representation of an aircraft.
Figure 2:
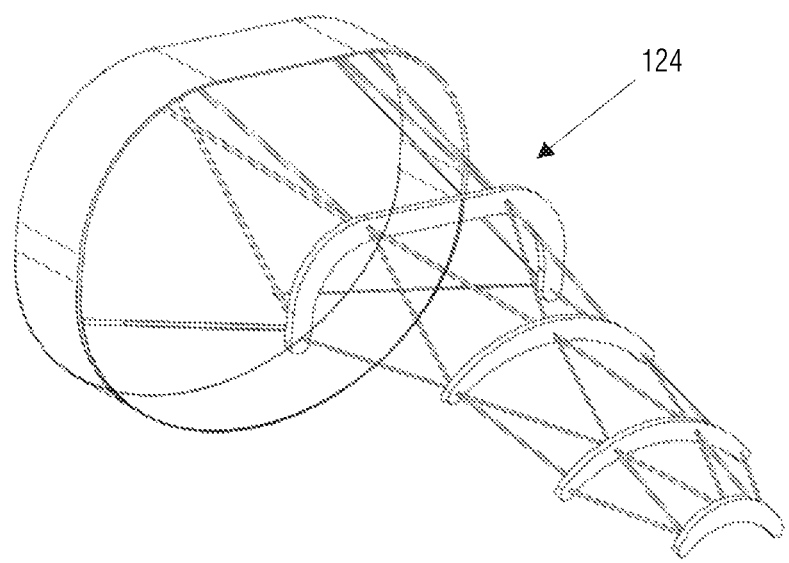
FIG. 2 is a schematic representation of a support for an auxiliary power unit (APU) in an tail cone of a fuselage of the aircraft.
Figure 3:
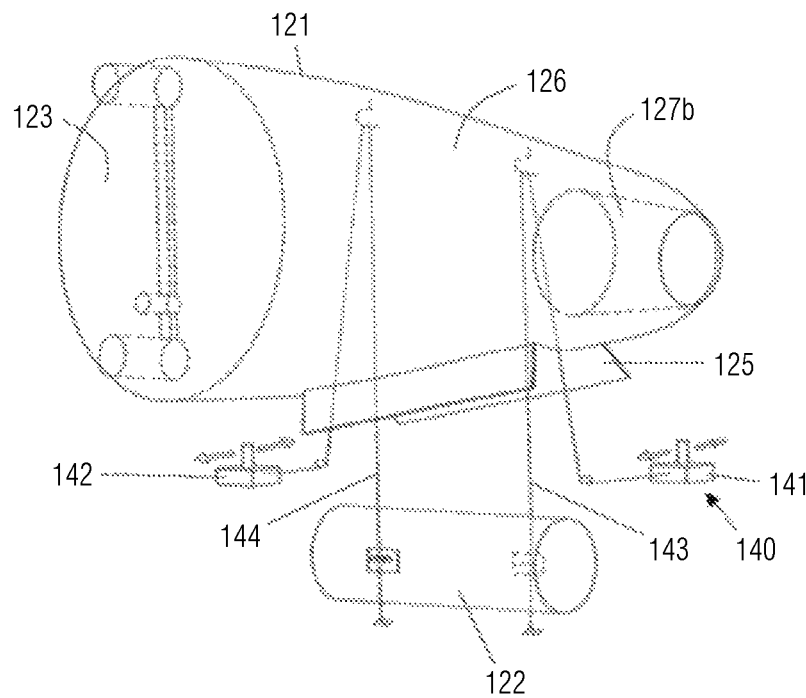
FIG. 3 is a schematic representation of a fish pole wire lift system to raise the APU into a compartment of the tail cone.

As shown in FIG. 6b, the upper bar 480 comprises respectively two ends 481, 482, where the end 481 comprises a hole 483 fit to receive an attachment device 484, as shown in FIGS. 6c1 to 6c3. The attachment means 484 is fixed to an upper portion of the compartment 126 in the tail cone. This attachment means 484 comprises a fixation means 485, such as a fitting bolt, to fixate the elevator system 400 via the upper bar 480 to the structure of the APU compartment 126.

The attachment means (device) 484 also comprises also an expandable means 486, such as a spring system for example. The expandable means 486 is fitted to adjust the length of the bar assembly 450 and fits the distance between the upper bar 480 and the upper surface 411 of the support 410. The expandable means 486 fits to the hole 483 of the end 481 of the upper bar 480 to allow to the bar 450 and its bar assembly 450 to rotate freely while connected to the upper surface 411.

As the bar assembly 450 turns, the threads on the bar assembly causes the APU attached to the bar assembly, to move up or down and into or out of the compartment 126 in the tail cone. The bar assembly 450 supports the APU or any other load mounted to the bar assembly 450. To support the APU, the expandable means 486, as well as the attachment device 484 and bar assembly 450, are configured to support load at least 1000 kg.

The end 482 of the upper bar 480 comprises a hole 487 able to receive a fitting bolt 473 from the middle bar 470. As shown in FIG. 6d, each middle bar 470 comprises respectively two ends 471, 472, where a first end 471 comprises a fitting bolt 473 able to screw respectively inside the fitting hole 487, 474 of the upper bar 480 or of another middle bar 470. The other end 472 comprises a fitting hole 474 able to receive a fitting bolt 473 from standard bar 470 or a fitting bolt 463 from lower bar 460.

Each lower bar 460 comprises respectively two ends 461, 462. A first end 461 comprises a fitting bolt 463 able to screw inside a fitting hole 474 of the standard bar 470 or the fitting hole 487 of the upper bar 480, and where the second end 462 comprises a through bore 464 able to receive the through bolt 426.

Each upper bar 480, middle bar 470 or lower bar 460 is defined as being a metallic cylinder with a radius R and a height H, such as the radius R is defined sufficiently to support the weight W of the APU according the final height of the bar 450.

The lower bar 460 comprise at its end 462 a flat circular base 465 able to fit between the connecting rods 424. For that, the distance between the connecting rods 420 is 2R.

The flat circular base 465 allows to avoid the articulation of the bar 450 on the axis X, and the bolt 426 going through respectively the hole 425 and 464 as shown in FIG. 6e, for connecting the bar 450 on the upper surface 423 of the circular plate 422.

As shown in FIGS. 6f1 to 6f4, a mount bracket 490 comprises two linked parts, where the first part is a translation means 491 on the bar 450, and the second part is a support means 492. The support means 492 is a bracket able to be fastened to the lateral part 122a, 122b of the APU 122 via bolts 493. The translation means 491 comprises a ring 494 comprising a female thread. The lower bar 460 and the middle bar 470 comprise respectively on their external surface a male thread 466, 476. The male thread engages the translation means 492 and causes the translation means 492, and the APU supported by the translation means, up or down the bar assembly as the bar assembly rotates.

Two or more bar assemblies 450 may be used to lift or lower the APU into or out of the compartment of the tail cone. To use two or more bar assemblies, the rotation of these bar assemblies is synchronized to ensure that the APU is raised or lower uniformly by both or all of the bar assemblies. Thus, the motors 452 that drive the rotation of the bar assemblies are controlled to synchronize the rotations of the bar assemblies.

The Elevator System 400 is controlled and monitored by an operator controlled terminal. The terminal comprising a set of microprocessors and electronic associated, such as for example in a non-exhaustive list wireless emitters and receivers, a stylus, a voice recorder able via a tactile display to be an interface IHM between an operator and the elevator system 400.

In the terminal, the microprocessors and/or other digital electronic controllers perform the logic and execute instructions, e.g., software, for all working modes of the elevator system 400 such as:

(i) a wireless synchronization phase of the different motors with the terminal;

(ii) control of the motor of the wheel 413;

(iii) control and regulation of the velocity to up or down the APU, and (iv) different sequences of shut down.

The terminal manages the synchronization of the motors 452 of the elevator system 400. In order to do that, each motor comprises a control unit with wireless components associated, such as a wireless emitter and receiver. Each control unit is able to be in idle when the terminal is switch off or is out of the wireless field of the motors. The set of motors of the elevator system 400 are fed by a rechargeable and removable battery. The battery is housed on the support 410 in an accessible part but not on the surface 411. To perform the synchronization phase, the terminal apply the following steps:

(i) determining of a list of wireless motors that are active, which contain three categories, such as "motor for direction" of the wheel 413, "motor for orientation" of the wheel 413, "motor to up and down" the load, (ii) connecting of the terminal to the wireless motor active, and (iii) synchronization of each motor of each categories to move step by step in the same direction, and/or orientation and/or velocity.

The terminal is able via wireless communication to control the different motors of the wheel 413 to interact on the direction, orientation, velocity, and brake system. For that, the terminal apply the following steps:

(i) Detection of a set of instruction from the operator composed with a direction, such as move forward, or move backward, and an orientation, such as turn right, or turn left, or move threat;

(ii) Deactivation of the brake system, put by default when the operator doesn't interact with the terminal;

(iii) Regulation of the velocity to move the support 410 according the pressure on the tactile interface of the terminal; and (iv) Activation of the brake system after complete realization of the instruction;

The terminal controls and regulates the velocity to up and down the load, such as the APU 122. For that, the terminal apply the following steps:

(i) Detection of an instruction from the operator such as "UP" or "Down";

(ii) Deactivation of the brake system, put by default when the operator doesn't interact with the terminal;

(iii) Regulation of the velocity and the sense of rotation of each bar 450 to move up or down the load via the translation of each mount bracket 490, the velocity being relative to the pressure on the tactile interface of the terminal;

(iv) Activation of the brake system after complete realization of the instruction;

The terminal proceeds to different sequences of shut down. For that, the terminal apply the following steps:

(i) If detection of contradictory instructions, when activation of the brake system and the last instruction received is removed;

(ii) for the motors of the wheels, if there is a detection of steps de-synchronization of at least one motor with respect to the others motors of its category, then activation of the brake system and setup of the counter of step;

(iii) for the motors to up or down the load, if there is a detection of steps de-synchronization of at least one motor with respect to the others motors of its category, then activation of the brake system, except for the motors in advance until all mount bracket arrive at the same level that the others; for that the operator has the possibility to turn the motors not brake in order to down the load via the interface;

(iv) if detection of a wireless de-synchronization of at least one motor with the terminal, then activation of the brake system and the synchronization phase restart; and (v) for any emergency or request from the operator to stop the Elevator System, the operator via the interface is able to activate the brake system.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An elevator system to assist with an installation of a load into a compartment of an aircraft via a door to the compartment and located in a lower region of the aircraft, the elevator system comprising:

a support mounted on a set of wheels, and configured to be moved by at least one electric motor, wherein the at least one electric motor is controlled by a terminal;

the support includes an upper surface having thereon attachment points;

base elements each attached to one of the attachment points on the upper surface of the support;

attachment devices each of which is configured to attach to an internal structure of the aircraft in the compartment;

bar assemblies each of which comprising:

an upper bar including a first end with a hole configured to receive one of the attachment devices and a second end of the upper bar includes a first fitting hole;

at least one middle bar including a first end having a first fitting bolt and a second end including a second fitting hole, wherein the first fitting bolt is configured to engage the first fitting hole of the upper bar or the second fitting hole of another one of the at least one middle bar; and a lower bar including a first end having a second fitting bolt configured to screw into the second fitting hole of a lowermost one of the at least one middle bar, and a second end having a through bore configured to receive a through bolt to link a bar assembly to a respective one of the base elements;

wherein the lower bar and the at least one middle bar include respectively a threaded external surface configured to engage a mount bracket fastened to the load; and at least one electric motor mounted to the support and configured to rotate each of the bar assemblies;

wherein the terminal is a user operated terminal configured to be fixed to the support or to be portable, wherein the user operated terminal is configured to control the at least one electric motor to rotate the bar assemblies to move the load up or down into or out of the compartment.

2. The elevator system according claim 1, wherein each of the attachment devices comprises:

a fixation device is configured to be attach the upper bar of a respective one of the bar assemblies to the internal structure, and an expandable device configured to adjust a length of the attachment device to close a distance between the upper bar of the respective one of the bar assemblies and the internal structure.

3. The elevator system according to claim 2, wherein the expandable device is configured to fit to the hole at the end of the upper bar of the respective one of the bar assemblies to allow to the bar assembly to rotate with respect to one of the attachment devices.

4. The elevator system according to claim 2, wherein, the expandable device is configured to support at least 1000 kg.

5. An elevator system configured to assist with an installation of an auxiliary power unit (APU) into a compartment within an aircraft, the elevator system comprising:
- a wheeled support;
- an attachment attached to an upper region of the compartment;
- bar assemblies each having a lower end mounted to the wheeled support and an upper end configured to be connected to the attachment within an upper region of the compartment, wherein the bar assemblies each have an outer threaded surface and are oriented vertically;
- at least one motor configured to synchronously rotate the bar assemblies to raise or lower the auxiliary power unit;
- mount brackets each having an aperture with an interior threaded surface configured to engage the threaded surface of one of the bar assemblies and each of the mount brackets have a mount configured to releasably connect to the auxiliary power unit,
- at least one motor supported by the wheeled support and configured to rotate each of the bar assemblies to move the mount brackets up and down while the mount brackets support the auxiliary power unit; and
- a motor controller mounted to the wheeled support or portable, and configured to receive inputs from an operator controlled terminal regarding moving the auxiliary power unit up or down and configured to control the at least one motor to rotate the bar assemblies to lift or lower the mount brackets in synchrony.

* * * * *